Jan. 2, 1940. C. F. HINES 2,185,667
COMPRESSOR BRAKE FOR TRAILERS, ETC
Filed July 6, 1939
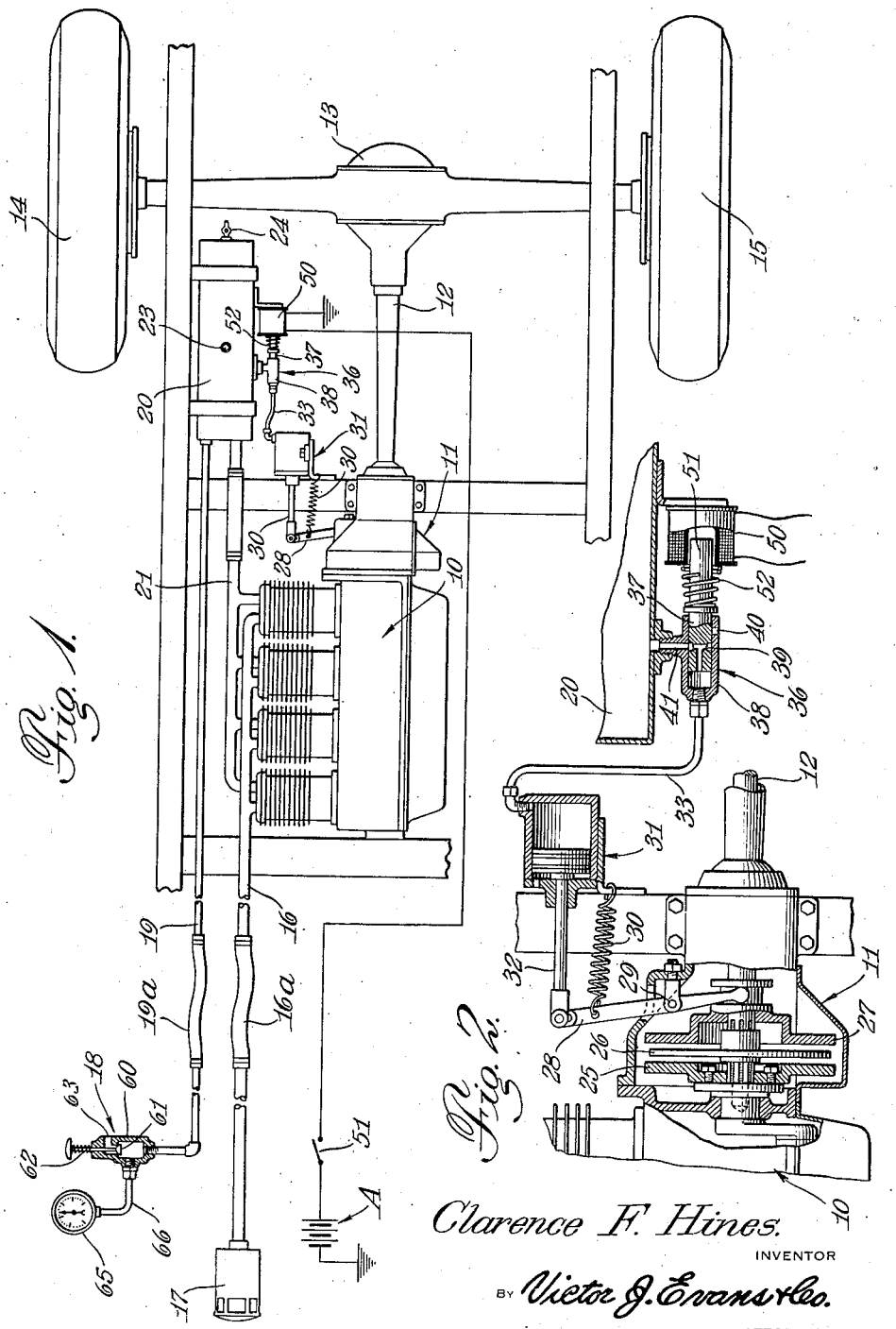
Clarence F. Hines.
INVENTOR
BY Victor J. Evans & Co.
ATTORNEYS Patented Jan. 2, 1940

2,185,667

UNITED STATES PATENT OFFICE 2,185,667

COMPRESSOR BRAKE FOR TRAILERS, ETC.

Clarence F. Hines, Mount Airy, N. C.

Application July 6, 1939, Serial No. 283,073

2 Claims. (Cl. 188—3)

This invention relates to improvements in means for controlling trailers, and especially is concerned with a novel brake mechanism suited to use with trailers for inhibiting too free motion of the trailer.

In vehicles of types now commonly in use comprising a traction unit and a trailer, it frequently is desirable to provide means for creating a drag on the trailer wheels in order to prevent the trailer, especially when descending hills, from "crawling up on" the traction unit. It is an object of the present invention to provide means for accomplishing this result.

Another object of the present invention is to provide a variable load unit connectible to trailer wheels whereby a drag may be caused to act upon said wheels for inhibiting undesired motion of the vehicle.

An advantage of the device according to this invention over other devices now in use is that although it is substantially completely contained in the trailer, it nevertheless is controlled from the driver's seat whereby the drag load may be varied to suit conditions of use.

Another feature of the device according to this invention is that it includes an essentially automatic control means whereby, when starting, the load is diminished to a negligible value but thereafter can be increased as conditions may warrant.

Another feature of the novel device according to the present invention is its simplicity of construction whereby both the economies of manufacture and low cost of upkeep are realized.

Other objects, advantages and features of the variable load trailer drag device according to the present invention will be apparent to those skilled in this art during the course of the following description.

Regarded in certain of its broader aspects, the novel trailer drag device according to this invention comprises in a braking system, for vehicle trailer wheels of the type including a differential connected to the axle carrying said trailer wheels and a compressor connected through a clutch to the jack shaft of said differential, of the improvements which comprise means for normally holding said clutch in engaged position; pneumatically actuable means for moving said clutch into disengaged position; a pneumatic storage reservoir continuously fed by the compressor and connected to said pneumatically actuable clutch operating means; and a manually operable valve for relieving pressure in said reservoir in a manner such that the compressor acts freely and not as a load upon the jack shaft.

In order to facilitate a fuller and more complete understanding of the novel device according to this invention, a specific embodiment thereof herein illustrated will be hereinafter described, it being clearly understood, however, that the illustrated embodiment and presently preferred is provided by way of example and not by way of limitation upon the present invention.

Referring then to the drawing,

Figure 1 is essentially a top plan view of a portion of a trailer chassis, parts being broken away for clearness of illustration, and a control valve being shown in sectional view, and Fig. 2 is essentially a fragmentary sectional view of portions of the clutch and clutch control mechanism illustrating structural details thereof.

Referring especially to Fig. 1, the numeral 10 designates a compressor unit connected through the clutch generally designated by the numeral 11 to the jack shaft 12 of the differential 13 wherein trailer wheels 14 and 15 are carried. It is to be understood that, when the clutch 11 is in engaged position, movement of the vehicle with concomitant rotation of the trailer wheels 14 and 15 causes rotation of the jack shaft 12 and operation, that is reciprocation of pistons, of the compressor 10.

In the preferred embodiment of the invention the compressor intake is fed through the line 16 from the inlet 17, the latter preferably being mounted in the vicinity of the traction unit motor in order to prevent intake of excess cold air which might, upon occasion, cause ice formation within parts of the compressor interfering with the operation thereof. A manually operated control valve generally designated by the numeral 18 is connected by the line 19 to the pneumatic storage reservoir 20 which is continuously fed by the compressor 10 through the line 20. It will be noted that the lines 16 and 19 are provided with flexible couplings 16a and 19a respectively for facilitating connection between the traction unit and the trailer. As will be evident from consideration of the drawing, operation of the compressor 10 increases pressure of fluid within the reservoir 20 and, of course, as the pressure within the reservoir increases, the difficulty of operating the compressor or, in other words, the load value increases. It will be evident too that operation of the valve 18, whereby the pressure within the reservoir 20 can be relieved, can, upon occasion, serve as convenient means for altering the load applied by the compressor of the jack shaft 12. A safety valve 23 on the pneumatic reservoir 20 is provided to prevent development of undesired or dangerous pressure within the reservoir. A pet cock 24 is provided on the storage reservoir 20 to facilitate draining, upon occasion, of condensed moisture therefrom.

The novel mechanism according to the present invention for controlling operation of the clutch 11 will now be described, reference being made particularly to Fig. 2 of the drawing wherein it will be noted that the clutch generally designated by the numeral 11 comprises a first plate 25 essentially fixedly mounted upon the shaft to the compressor 10, and a second plate 26 fixedly mounted on the jack shaft 12 for rotation therewith. A third plate 27, freely rotatably mounted upon an end portion of the jack shaft 12 near the second plate 26 and axially slidingly movable by the lever 28 pivotally mounted upon portions of the clutch casing generally designated by the numeral 29, is provided for pressing into frictional engagement the first plate 25 and the second plate 26, hereinabove described, whereby rotation of the jack shaft 12 causes operation of the compressor. It is to be noted that the spring tensioning means 30 attached to the lever arm 28 and to portions of the chassis frame normally urges the lever in a clockwise direction whereby the first and second plates of the clutch are pressed into frictional engagement as aforesaid. Hence it follows that except upon actuation of the pneumatic control, as will hereinafter be described, the clutch normally is in engaged position and the compressor is operated by movement of the vehicle.

The means for causing disengagement of the clutch 11 will now be described. A pneumatic motor generally indicated by the numeral 31 connected to the lever 28 by the sliding member 32 is operable by passage of pneumatic fluid through the line 30 controlled by the valve generally designated by the numeral 36 which communicates with the reservoir 20 hereinabove described. The valve 36 comprises a sliding valve member 37 positioned within the valve casing 38 and provided with internal T-shaped openings 39 registerable with openings 40 and 41 in the valve casing whereby, upon occasion, communication can be established between the opening 41 and the line 33, or on a different occasion, communication can be established between the line 33 and the opening 40. In the first instance, pneumatic fluid passes from the reservoir 20 through the line 33 to cause sliding motion of the member 32 moving the lever 28 in anti-clockwise direction against the action of the spring tensioning means 30, thereby causing disengagement of the first plate and the second plate 26 of the clutch 11. In the second instance, that is when communication is established between the line 33 and the opening 40 of the valve 36, pneumatic fluid within the motor 31 will discharge through said opening by reason of action of the spring tensioning means 30. The sliding motion of the valve 37 within the casing 38 is produced in one direction by operation of the solenoid 50 acting upon the metallic core 51 therein positioned and connected to the sliding valve and in the opposite direction by means of the spring pressing means 52. Operation of the solenoid establishes connection between the line 33 and the opening 40: operation of the spring pressing means 52 moves the sliding valve into position whereby communication is established between the opening 41 and the line 33, or in other words, the function of the spring pressing means 52 is to establish communication between the reservoir 20 and the pneumatic motor 31 for operating the latter and causing disengagement of the clutch 11. The position of the valve illustrated in Fig. 2 resulting from action of the spring pressing means 52, as described, is the ordinary position: the position occupied by the valve 37 upon actuation of the solenoid 50 is the extraordinary position and the purpose of moving the valve to this position will hereinafter be described. The solenoid 50 is controlled by operation of the switch 51 which serves to create or interrupt connection between the solenoid and the power source generally designated by the letter A.

The manually operable valve for relieving pressure within the reservoir 20 will now be described, reference being made especially to Fig. 1 wherein the numeral 60 designates the valve casing and the numeral 61 the sliding valve, normally pressed into closed position by the spring 62, substantially as shown, whereby communication between the line 19 and the outlet orifice 63 of the valve is prevented. The pressure gauge 65 communicating by means of the line 66 with the interior of the valve casing 60 is useful for indicating pneumatic pressure in the line 19.

Having thus described the structure of the device according to the present invention and its preferred mode of association with parts of the trailer structure, the operation of the device will next be described. Assuming, for purposes of illustration, that the trailer is at rest, that is to say the trailer wheels 14 and 15 are not in motion and pressure within the reservoir 20 is of the order of atmospheric pressure, it will next be assumed that the vehicle is moved. It will be recalled that the clutch 11 is in engaged position normally and, accordingly, rotation of the trailer wheels 14 and 15 by motion of the vehicle causes operation of the compressor, whereby pressure of fluid within the reservoir 20 is increased. A pressure of fluid within the line 19, which of course corresponds with the pressure of fluid within the reservoir 20, can of course be observed by the operator of the vehicle from the gauge 65. As motion of the vehicle causes increase in fluid pressure within the reservoir 20, fluid passes therefrom through the opening 41 of the valve casing 38 and the opening 39 of the valve 37 to the line 33, thereby causing operation of the fluid motor 31 which, acting against the spring tensioning means, causes disengagement of the clutch 11. Upon disengagement of the clutch, of course, further operation of the compressor ceases. Next, assuming that it is desired to apply a load to the jack shaft 12 thereby impeding rotation of the trailer wheels 14 and 15, the vehicle operator closes the switch 51, actuating the solenoid 50 which, moving the sliding valve 37 within the valve casing 38, permits reverse action of the fluid motor 31 as fluid therefrom is discharged through the line 33 and the outlet 40 of the valve casing 38 under action of the spring tensioning means 30. In this manner the clutch 11 is moved into engaged position and the load resulting from operation of the compressor is applied to the jack shaft. So long as the circuit including the power source A and the solenoid is completed, or so long as the pressure of fluid within the reservoir 20 is less than sufficient to operate the pneumatic motor 31 against the spring tensioning means 30, the clutch 11 is in engaged position and the compressor is operated by motion of the vehicle. Assuming that it is desirable to alter the load applied to the jack shaft, it of course will be evident that this easily can be accomplished by operation of the manual valve 18 whereby fluid can be discharged from the reservoir 20 by the line 19 through the outlet orifice 63 of the valve 18 as hereinabove described. In this manner not only can the load be varied, but upon occasion, substantially entirely removed by completely relieving pressure within the fluid reservoir. Of course this condition likely would not arise inasmuch as the load can be completely relieved by disengagement of the clutch 11 in the manner aforesaid.

Having thus described the present invention, what it is desired to secure by Letters Patent is:

1. In a braking system for vehicle trailer wheels of the type including a differential connected to the axle carrying said trailer wheels and a compressor connected through a clutch to a jack shaft and said differential, the improvements which comprise resilient spring-tensioning elements for normally holding said clutch in engaged position; means comprising a pneumatic motor for moving said clutch into disengaged position; a pneumatic storage reservoir continuously fed by the compressor and connected to said pneumatic motor; a manually operable valve for relieving pressure in said reservoir permitting said compressor to operate freely and without load; and a valve controlling communication between said reservoir and said pneumatic motor comprising a spring pressed sliding valve member normally positioned whereby communication between said reservoir and said motor is established, and a solenoid acting upon said sliding valve for, upon occasion, moving same into a position whereby fluid can be discharged from said pneumatic motor permitting engagement of the clutch.

2. In a braking system for vehicle trailer wheels of the type including a differential connected to the axle carrying said trailer wheels and a compressor connected through a clutch to the jack shaft of said differential, the improvements which comprise resilient spring-tensioning elements for normally holding said clutch in engaged position; pneumatically actuable means comprising a chamber and a piston sliding therein for moving said clutch into disengaged position; a pneumatic storage reservoir continuously fed by the compressor and connected to said pneumatically actuable clutch operating means; a manually operable valve for relieving pressure in said reservoir permitting said compressor to operate freely and without load; and a valve controlling communication between said reservoir and said pneumatically actuable clutch operating means comprising a spring-pressed sliding valve member normally positioned whereby communication between said reservoir and said motor is established, and a solenoid positioned circumjacent parts of said valve acting thereon for, upon occasion, moving same into a position whereby fluid can be discharged from said pneumatically actuable clutch operating means permitting engagement of the clutch.

CLARENCE F. HINES.